United States Patent
Xiao

(10) Patent No.: US 10,838,272 B2
(45) Date of Patent: Nov. 17, 2020

(54) ARRAY PANEL

(71) Applicant: WUHAN CHINA STAR OPTOELECTRONICS TECHNOLOGY CO., LTD., Hubei (CN)

(72) Inventor: Shidi Xiao, Hubei (CN)

(73) Assignee: Wuhan China Star Optoelectronics Technology Co., Ltd., Hubei (CN)

( * ) Notice: Subject to any disclaimer, the term of this patent is extended or adjusted under 35 U.S.C. 154(b) by 61 days.

(21) Appl. No.: 16/309,385

(22) PCT Filed: Sep. 11, 2018

(86) PCT No.: PCT/CN2018/104993
§ 371 (c)(1),
(2) Date: Dec. 12, 2018

(87) PCT Pub. No.: WO2020/037731
PCT Pub. Date: Feb. 27, 2020

(65) Prior Publication Data
US 2020/0117064 A1    Apr. 16, 2020

(30) Foreign Application Priority Data
Aug. 22, 2018  (CN) .......................... 2018 1 0959511

(51) Int. Cl.
*G02F 1/1362*       (2006.01)
*G02F 1/1333*       (2006.01)

(52) U.S. Cl.
CPC .. *G02F 1/136227* (2013.01); *G02F 1/133345* (2013.01); *G02F 1/136286* (2013.01); *G02F 2001/133357* (2013.01)

(58) Field of Classification Search
CPC ......... G02F 1/136227; G02F 1/133345; G02F 1/136286
See application file for complete search history.

(56) References Cited

U.S. PATENT DOCUMENTS

| | | | | |
|---|---|---|---|---|
| 2006/0146260 A1* | 7/2006 | Lee | ................... | G02F 1/136213 349/143 |
| 2016/0161788 A1* | 6/2016 | Wu | ................... | G02F 1/133345 349/43 |
| 2016/0291750 A1* | 10/2016 | Chai | ....................... | G06F 3/044 |
| 2019/0235294 A1* | 8/2019 | Wang | ...................... | G06F 3/044 |

* cited by examiner

*Primary Examiner* — Christine A Enad
(74) *Attorney, Agent, or Firm* — Muncy, Geissler, Olds & Lowe, P.C.

(57) ABSTRACT

An array panel includes at least: a first via-hole disposed on a surface of the interlayer insulating layer; a second via-hole disposed on a surface of the planarization layer; a third via-hole disposed on a surface of the passivation layer; a pixel electrode layer; a light-shielding layer; wherein the third via-hole partially overlaps the first via-hole or an interconnect formed by connecting both ends of the active layer on the first via-hole is parallel to an arrangement direction of the gate signal wire.

18 Claims, 4 Drawing Sheets

ARRAY PANEL

FIELD OF INVENTION

The present invention relates to the field of display technology and specifically relates to an array panel.

BACKGROUND OF INVENTION

Currently, low-temperature polysilicon technology has been widely used in small and medium-sized panels such as mobile phones and computer display screens, and as the market requirement for panel resolution is gradually increased, the size of each pixel is gradually reduced. Smaller pixels, due to the reduced aperture ratio, can greatly affect panel penetration.

In addition, in the case of the same pixel size, the panel with higher penetration rate also helps to reduce the panel energy consumption and improve the battery life.

In summary, the conventional array panel, since a part of the source/drain metal layers disposed on the island-like bridge region of the middle of pixels occupies a portion of the pixel area, which results in the reduced of the aperture ratio of the pixel, which further limits the light utilization rate and further causes the insufficiency of the display brightness.

Technical Problem

The conventional array panel, a part of the source/drain metal layers disposed on the island-like bridge region of the middle of pixels occupies a portion of the pixel area, which causes the reduction of the aperture ratio of the pixel, further limiting the light utilization rate, and further causing the insufficiency of display brightness.

Technical Solution

The invention provides an array panel, which can reduce the pixel area occupied by a part of the source/drain metal layers disposed on the island-like bridge region in the middle of the pixels, so as to solve the existing high aperture ratio pixel structure, since a part of the source/drain metal layer disposed on the island-like bridge region in the middle of the pixel occupies a certain pixel area, the aperture ratio of the pixel is lowered, which further limits the light utilization efficiency, and further causes a technical problem of insufficient display brightness.

In order to solve the above problems, the technical solution provided by the present invention is as follows:

The present invention provides an array panel including a substrate, an active layer disposed on the substrate, a gate insulating layer disposed on a surface of the substrate and covering the active layer, the interlayer insulating layer disposed on the gate insulating layer, the first via-hole on which the interlayer insulating layer is disposed, the source/drain metal layer disposed on the interlayer insulating layer, the planarization layer disposed on the source/drain metal layer, the second via-hole disposed on the planarization layer, the passivation layer disposed on the planarization layer, the third via-hole disposed on the passivation layer, the pixel electrode layer disposed on the passivation layer, the gate signal wire disposed on the substrate, the source signal wire disposed on the substrate, and the light-shielding layer disposed along an arrangement direction of the gate signal wire.

The source/drain metal layer is in communication with the active layer through the first via-hole; the pixel electrode layer is in communication with the source/drain metal layer through the second via-hole and the third via-hole; the source signal wire is in communication with the active layer through the first via-hole; the light-shielding layer completely covers the gate signal wire, the source/drain metal layers and a portion of the pixel electrode layer; the third via-hole is in communication with the second via-hole, the depth of the third via-hole is greater than the depth of the first via-hole, the third via-hole partially overlaps the first via-hole or an interconnect formed by connecting both ends of the active layer on the first via-hole is parallel to an arrangement direction of the gate signal wire.

In the array panel provided by the embodiment of the present application, each of the first via-hole, the second via-hole and the third via-hole has an inverted trapezoidal cross section.

In the array panel provided by the embodiment of the present application, the first via-hole extends through the interlayer insulating layer and the gate insulating layer and terminates in the active layer.

In the array panel provided by the embodiment of the present application, the second via-hole extends through the planarization layer and terminates in the source/drain metal layers.

In the array panel provided by the embodiment of the present application, the third via-hole extends through the passivation layer and terminates in the source/drain metal layer.

In the array panel provided by the embodiment of the present application, when the third via-hole partially overlaps the first via-hole, the length of the source/drain metal layer is smaller than non-overlapped length between the third via-hole and the first via-hole.

In the array panel provided by the embodiment of the present application, when an interconnect formed by connecting both ends of the active layer on the first via-hole is parallel to an arrangement direction of the gate signal wire, the source/drain metal layer is a rectangle having a long side parallel to the gate signal wire.

In the array panel provided by the embodiment of the present application, the source/drain metal layer partially overlaps the gate signal wire.

In the array panel provided by the embodiment of the present application, a portion of the third via-hole is disposed on an overlap region of the source/drain metal layer and the gate signal wire.

The present invention further provides an array panel including a substrate, an active layer disposed on the substrate, a gate insulating layer disposed on a surface of the substrate and covering the active layer, the interlayer insulating layer disposed on the gate insulating layer, the first via-hole on which the interlayer insulating layer is disposed, the source/drain metal layer disposed on the interlayer insulating layer, the planarization layer disposed on the source/drain metal layer, the second via-hole disposed on the planarization layer, the passivation layer disposed on the planarization layer, the third via-hole disposed on the passivation layer, the pixel electrode layer disposed on the passivation layer, the gate signal wire disposed on the substrate, the source signal wire disposed on the substrate, and the light-shielding layer disposed along an arrangement direction of the gate signal wire.

The source/drain metal layer is in communication with the active layer through the first via-hole; the pixel electrode layer is in communication with the source/drain metal layer through the second via-hole and the third via-hole; the source signal wire is in communication with the active layer through the first via-hole; the light-shielding layer completely covers the gate signal wire, the source/drain metal layers and a portion of the pixel electrode layer; the third via-hole is in communication with the second via-hole, the third via-hole partially overlaps the first via-hole or an interconnect formed by connecting both ends of the active layer on the first via-hole is parallel to an arrangement direction of the gate signal wire.

In the array panel provided by the embodiment of the present application, each of the first via-hole, the second via-hole and the third via-hole has an inverted trapezoidal cross section.

In the array panel provided by the embodiment of the present application, the first via-hole extends through the interlayer insulating layer and the gate insulating layer and terminates in the active layer.

In the array panel provided by the embodiment of the present application, the second via-hole extends through the planarization layer and terminates in the source/drain metal layer.

In the array panel provided by the embodiment of the present application, the third via-hole extends through the passivation layer and terminates in the source/drain metal layer.

In the array panel provided by the embodiment of the present application, when the third via-hole partially overlaps the first via-hole, the length of the source/drain metal layer is smaller than non-overlapped length between the third via-hole and the first via-hole.

In the array panel provided by the embodiment of the present application, when an interconnect formed by connecting both ends of the first via-hole that communicates with the active layer is parallel to an arrangement direction of the gate signal wire, the source/drain metal layer is a rectangle having a long side parallel to the gate signal wire.

In the array panel provided by the embodiment of the present application, the source/drain metal layer partially overlaps the gate signal wire.

In the array panel provided by the embodiment of the present application, a portion of the third via-hole is disposed on an overlap region of the source/drain metal layer and the gate signal wire.

Beneficial Effect

The array panel provided by the present invention has the via-hole disposed on the interlayer insulating layer partially overlapped with the via-hole disposed on the passivation layer, or an interconnect formed by connecting both ends of the via-hole disposed on the interlayer insulating layer that communicates with the active layer is parallel to an arrangement direction of the gate signal wire, thereby reducing the pixel area occupied by the source/drain metal layers disposed on the island-like bridge region in the middle of the pixel, improving the aperture ratio of the pixel structure, and further improving the display effect of the pixel structure.

DESCRIPTION OF DRAWINGS

In order to more clearly illustrate the technical solutions in the embodiments of the present invention, the following figures described in the embodiments will be briefly introduced. It is obvious that the drawings described below are merely some embodiments of the present invention, other drawings can also be obtained by the person ordinary skilled in the field based on these drawings without doing any creative activity.

DETAILED DESCRIPTION OF PREFERRED EMBODIMENTS

Figure 1:
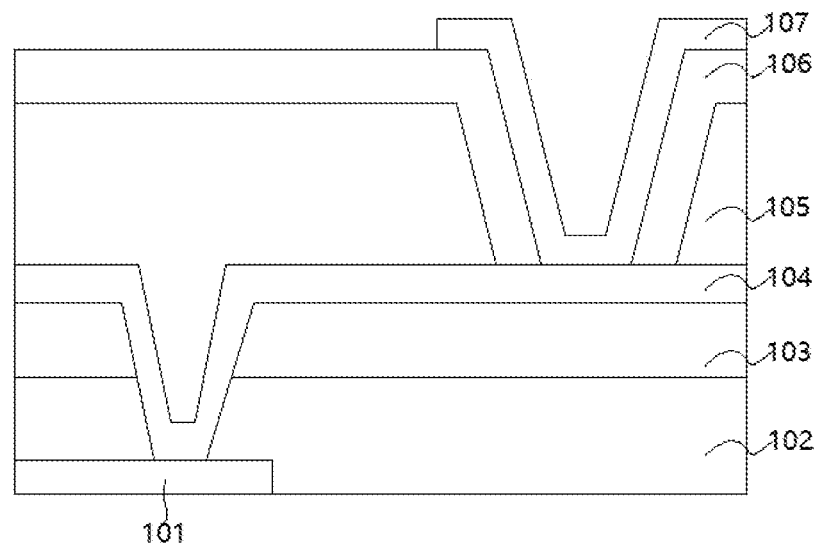
FIG. 1 is a schematic cross-sectional view of the pixel structure of a prior art.

The following description of the various embodiments is provided to illustrate the specific embodiments of the invention. The directional terms mentioned in the present invention, such as "on," "below", "front", "behind", "left", "right", "inside", "outside", "side", etc., are merely references of the direction in the drawings. Therefore, the directional terminology used is for the purpose of illustration and understanding of the invention rather than limiting the invention. In the drawings, the structurally similar elements are denoted by the same reference numerals.

The present invention is directed to the existing array panel, since a part of the source/drain metal layer disposed on the island-like bridge region of the pixel occupies a certain pixel area, causing a decrease in the aperture ratio of the pixel, further limiting the light utilization rate, and further causing insufficient display brightness, the present embodiment can solve the drawback.

FIG. 1 is a schematic cross-sectional view of a pixel structure in the prior art, wherein a substrate is provided, an active layer 101 is formed on the surface of the substrate, and then a gate insulating layer 102 is deposited on the surface of the substrate and the active layer 101 by physical vapor deposition; thereafter, an interlayer insulating layer 103 is prepared on the surface of the gate insulating layer 102; next, a source/drain metal layer 104 is prepared on the surface of the interlayer insulating layer 103; Thereafter, a planarization layer 105 is prepared on the surface of the source/drain metal layer 104; a passivation layer 106 is then formed on the surface of the planarization layer 105; finally, a pixel electrode layer 107 is prepared on the surface of the passivation layer 106.

Figure 2:
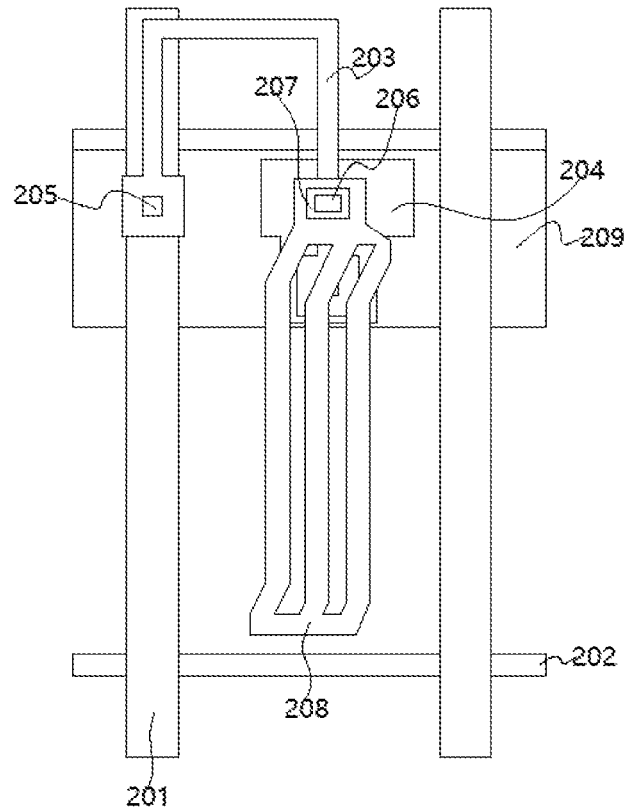
FIG. 2 is a schematic diagram of a pixel structure of the prior art.

FIG. 2 is a schematic diagram of a pixel structure of the prior art. The vertical signal wire is the source signal wire 201 of the pixel, and the horizontal signal wire is the gate signal wire 202 of the pixel; the active layer 203 connects the source signal wire 201 and the source/drain metal layer 204 through via-hole 205 disposed on the interlayer insulating layer, and when the TFT device is turned on, the signal on the source signal wire 201 is conducted to the source/drain metal layer 204; the pixel electrode layer 208 is bridged by the via-hole 206 on the passivation layer and the via-hole 207 on the planarization layer and the source/drain metal layer 204 such that the signals on the source signal wire 201 can be conducted to the pixel electrode layer 208; the light-shielding layer 209 is further disposed on the pixel structure, and the light-shielding layer 209 is disposed along the direction of the gate signal wire 202.

The light-shielding layer 209 completely covers the gate signal wire 202, the source/drain metal layer 204 and a portion of the pixel electrode layer 208, the light-shielding layer 209 blocks the above-mentioned regions to prevent technical problems such as light leakage and color shift.

Figure 3:
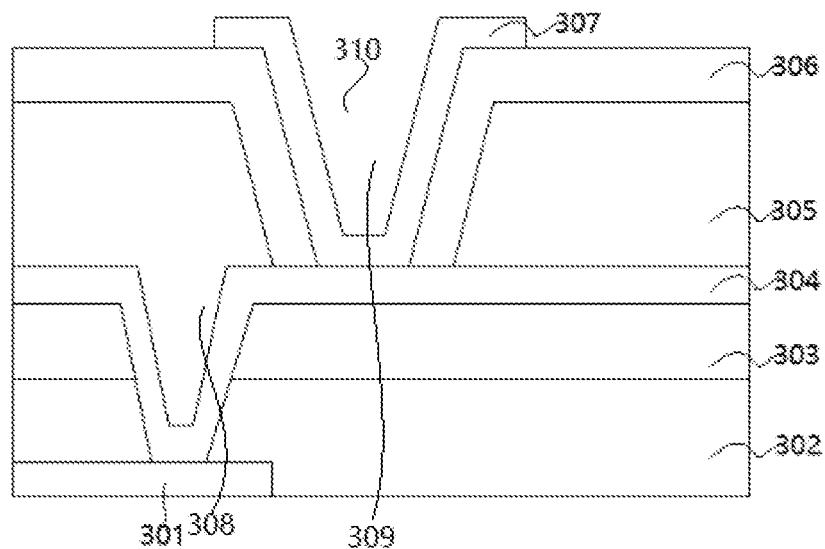
FIG. 3 is a schematic cross-sectional view of an array panel of the present invention.

FIG. 3 is a schematic cross-sectional view of an array panel of the present invention. A substrate is provided, an active layer 301 is formed on the surface of the substrate, and then a gate insulating layer 302 is deposited on the surface of the substrate and the active layer 301 by physical vapor deposition; thereafter, an insulating layer 303 is prepared on the surface of the gate insulating layer 302, the surface of the interlayer insulating layer 303 is provided with a first via-hole 308; next, a source/drain metal layer 304 is prepared on the surface of the interlayer insulating layer 303, the source/drain metal layer 304 is in communication with the active layer 301 through the first via-hole 308; thereafter, a planarization layer 305 is prepared on the surface of the source/drain metal layer 304, and a surface of the planarization layer 305 is provided with a second via-hole 309, the planarization layer 305 completely covers the first via-hole 308; then, a passivation layer 306 is prepared on the surface of the planarization layer 305, the surface of the passivation layer 306 is provided with a third via-hole 310, and the third via-hole 310 is in communication with the second via-hole 309; and finally, a pixel electrode layer 307 is prepared on the surface of the passivation layer 306, and the pixel electrode layer 307 is in communication with the source/drain metal layer 304 through the second via-hole 309 and the third via-hole 310.

The third via-hole 310 is in communication with the second via-hole 309, and the third via-hole 310 partially overlaps the first via-hole 308; each of the first via-hole 308, the second via-hole 309 and the third via-hole 310 has an inverted trapezoid cross-section; the depth of the third via-hole 310 is greater than the depth of the first via-hole 308; the first via-hole 308 extends through the interlayer insulating layer 303 and the gate insulating layer 302 and terminates in the active layer 301; the second via-hole 309 extends through the planarization layer 305 and terminates in the source/drain metal layer 304; the third via-hole 310 extends through the passivation layer 306 and terminates in the source/drain metal layer 304.

Figure 4:
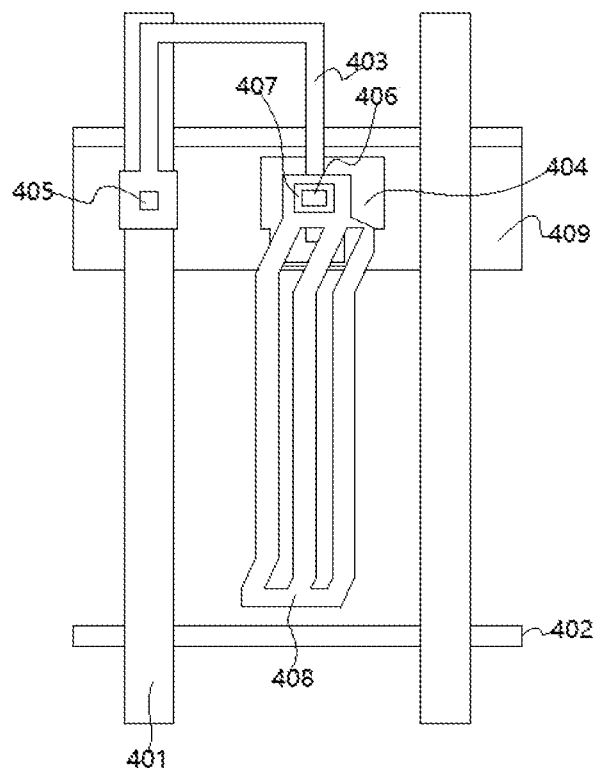
FIG. 4 is a schematic diagram of an array panel of solution 1 of the present invention.

FIG. 4 is a schematic diagram of an array panel of solution 1 of the present invention; the vertical signal wire is the source signal wire 401 of the pixel, and the horizontal signal wire is the gate signal wire 402 of the pixel; the active layer 403 connects the source signal wire 401 and the source/drain metal layer 404 through the first via-hole 405 and conducts a signal on the source signal wire 401 to the source/drain metal layer 404 when the TFT device is turned on; the pixel electrode layer 408 and the source/drain metal layer 404 are bridged by the third via-hole 406 and the second via-hole 407, thereby a signal on the source signal wire 401 can be conducted to the pixel electrode the layer 408, the material of the pixel electrode layer 408 is indium tin oxide.

The light-shielding layer 409 is further disposed on the pixel structure, and the light-shielding layer 409 is disposed along the direction of the gate signal wire 402, the light-shielding layer 409 completely covers the gate signal wire 402, the source/drain metal layer 404 and a portion of the pixel electrode layer 408, the light-shielding layer 409 blocks the above-mentioned regions to prevent technical problems such as light leakage and color shift.

The third via-hole 406 partially overlaps the first via-hole 405. When preparing the array panel of solution 1 of the present invention, the control of the process precision should be improved to prevent the first via-hole 405 from being stacked with the second via-hole 407 and the third via-hole.

Relative to the prior art, the array panel of solution 1 of the present invention wherein the first via-hole 405 partially overlaps the second via-hole 407 and the third via-hole 406 to shorten the length of the source/drain metal layer 404, the width of the light-shielding layer 409 is further compressed, the length of the crack in the pixel electrode layer 408 is further lengthened, the region of the effective electric field is increased, the aperture ratio of the pixel structure is improved, and the display effect of the pixel structure is further improved.

Figure 5:
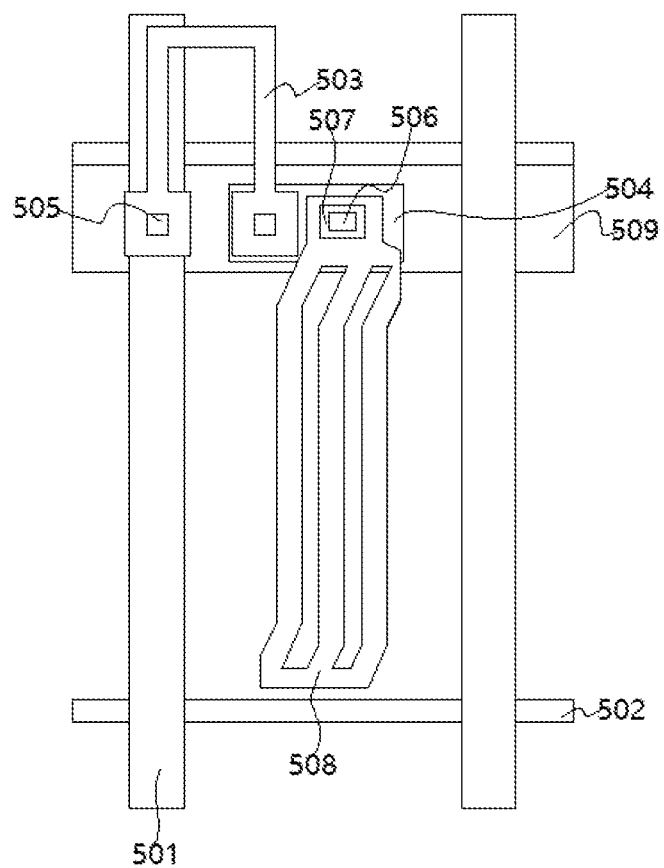
FIG. 5 is a schematic diagram of an array panel of solution 2 of the present invention.

FIG. 5 is a schematic diagram of an array panel of solution 2 of the present invention. The vertical signal wire is source signal wire 501 of the pixel, and the horizontal signal wire is gate signal wire 502 of the pixel; the active layer 503 connects the source signal wire 501 and the source/drain metal layer 504 through the first via-hole 505 and conducts a signal on the source signal wire 501 to the source/drain metal layer 504 when the TFT device is turned on; the pixel electrode layer 508 and the source/drain metal layer 504 are bridged by the third via-hole 506 and the second via-hole 507, thereby a signal on the source signal wire 501 can be conducted to the pixel electrode layer 508, the material of the pixel electrode layer 508 is indium tin oxide.

The light-shielding layer 509 is further disposed on the pixel structure, and the light-shielding layer 509 is disposed along the direction of the gate signal wire 502, the light-shielding layer 509 completely covers the gate signal wire 502, the source/drain metal layer 504 and a portion of the pixel electrode layer 508, the light-shielding layer 509 blocks the above-mentioned regions to prevent technical problems such as light leakage and color shift.

The third via-hole 506 is in communication with the second via-hole 507, an interconnect formed by connecting both ends of the first via-hole 505 that communicates with the active layer 503 is parallel to the arrangement direction of the gate signal wire 502, the source/drain metal layer 504 is a rectangle having a long side parallel to the gate signal wire 502.

Relative to the prior art, the array panel of solution 2 of the present invention, an interconnect formed by connecting both ends of the first via-hole 505 that communicates with the active layer 503 is parallel to an arrangement direction of the gate signal wire 502, thereby the length of the active layer 503 is shortened, the source/drain metal layer 504 is further disposed as a rectangle whose long side is parallel to the gate signal wire 502, the width of the light-shielding layer 509 is further compressed, the length of the crack in the pixel electrode layer 508 is further lengthened, the region of the effective electric field is increased, the pixel area occupied by the source/drain metal layer 504 disposed on the island-like bridge region in the middle of the pixel is further significantly reduced, the aperture ratio of the pixel structure is improved, and the display effect of the pixel structure is further improved.

Figure 6:
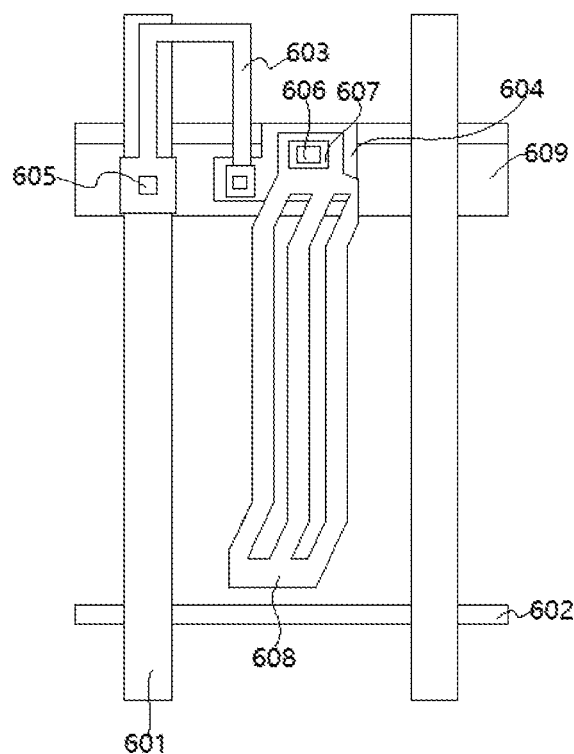
FIG. 6 is a schematic diagram of an array panel of solution 3 of the present invention.

FIG. 6 is a schematic diagram of an array panel of solution 3 of the present invention. The vertical signal wire is the source signal wire 601 of the pixel, and the horizontal signal wire is the gate signal wire 602 of the pixel; the active layer 603 connects the source signal wire 601 and the source/drain metal layer 604 through the first via-hole 605 and conducts a signal on the source signal wire 601 to the source/drain metal layer 604 when the TFT device is turned on. The pixel electrode layer 608 and the source/drain metal layer 604 are bridged by the third via-hole 606 and the second via-hole 607, thereby a signal on the source signal wire 601 can be conducted to the pixel electrode the layer 608, the material of the pixel electrode layer 608 is indium tin oxide.

The light-shielding layer 609 is further disposed on the pixel structure, and the light-shielding layer 609 is disposed along the direction of the gate signal wire 602.

The light-shielding layer 609 completely covers the gate signal wire 602, the source/drain metal layer 604 and a portion of the pixel electrode layer 608, the light-shielding layer 609 blocks the above-mentioned regions to prevent technical problems such as light leakage and color shift.

The third via-hole 606 is in communication with the second via-hole 607, an interconnect formed by connecting both ends of the first via-hole 605 that communicates with the active layer 603 is parallel to an arrangement direction of the gate signal wire 602, the source/drain metal layer 604 partially overlaps the gate signal wire 602; a portion of the third via-hole 606 is disposed on an overlapping region of the source/drain metal layer 604 and the gate signal wire 602.

Relative to the array panel designed by solution 2 of the present invention, the array panel designed by solution 3 of the present invention wherein the sizes of the source-drain metal layer 604 and the first via-hole 605 in the pixel are shortened, the shape of the source-drain metal layer 604 is reshaped so as to partially overlap the pixel electrode bridge region portion and the gate signal wire 602, the width of the light-shielding layer 609 is further compressed, the length of the crack in the pixel electrode layer 608 is further lengthened, the effective electric field action region is increased, moreover, the pixel area occupied by the source-drain metal layer 604 disposed on the island-like bridge region of the pixel is further greatly reduced, the aperture ratio of the pixel structure is improved, and the display effect of the pixel structure is further improved.

The array panel of solution 3 of the present invention, since the gate signal wire 602 is disposed below the source/drain metal layer 604, the bridge between the source/drain metal layer 604 and the pixel electrode layer 608 is not affected. However, this solution needs to enhance the electrical design at the same time in order to improve the panel transmittance while ensuring its normal display.

Figure 7:
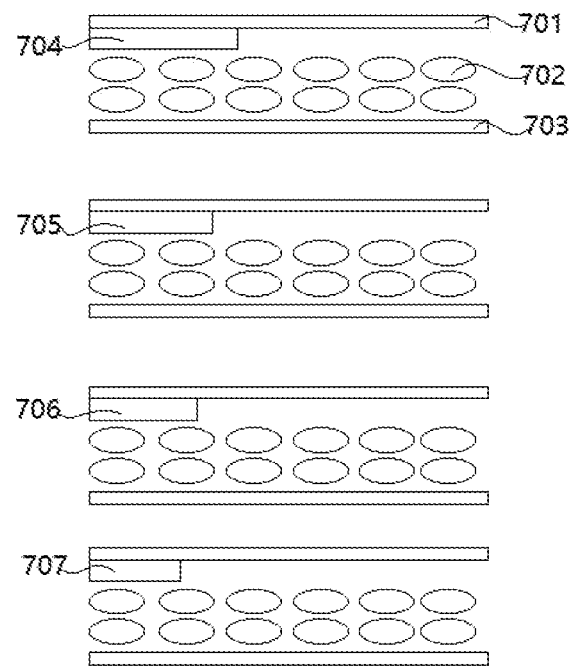
FIG. 7 is a schematic diagram illustrating the aperture ratios corresponding to various types of pixel structures in FIG. 2 and FIG. 4 to FIG. 6.

FIG. 7 is a schematic diagram illustrating the aperture ratios corresponding to various types of pixel structures in FIG. 2 and FIG. 4 to FIG. 6. 701 is a color filter, 702 is a liquid crystal, 703 is a TFT, and 704 is a first light-shielding layer of the prior art. 705 is a second light-shielding layer designed according to the array panel of solution 1 of the present invention. 706 is a third light-shielding layer designed according to the array panel of solution 2 of the present invention. 707 is a fourth light-shielding layer designed according to the array panel of solution 2 of the present invention.

The width of the second light-shielding layer 705 is less than the width of the first light-shielding layer 704; the width of the third light-shielding layer 706 is less than the width of the second light-shielding layer 705; the width of the fourth light-shielding layer 707 is less than the width of the first light-shielding layer 706.

The improvement of the array panel of the present invention causes the width of the light-shielding layer in the direction of the gate signal wire to be continuously reduced, so that the pixel aperture ratio is improved to different degrees, and thus has a remarkable effect on enhancing the panel transmittance.

The beneficial effects of the invention are:
The array panel provided by the present invention has a via-hole disposed on the interlayer insulating layer partially overlapped with the via-hole disposed on the passivation layer, or an interconnect formed by connecting both ends of the via-hole disposed on the interlayer insulating layer that communicates with the active layer is parallel to an arrangement direction of the gate signal wire, thereby reducing the pixel area occupied by the source/drain metal layers disposed on the island-like bridge region in the middle of the pixel, improving the aperture ratio of the pixel structure, and further improving the display effect of the pixel structure.

The description of the above exemplary embodiments is only for the purpose of understanding the invention. It is to be understood that the present invention is not limited to the disclosed exemplary embodiments. It is obvious to those skilled in the art that the above exemplary embodiments may be modified without departing from the scope and spirit of the present invention.

What is claimed is:

1. An array panel, comprising:
    a substrate;
    an active layer disposed on a surface of the substrate;
    a gate insulating layer disposed on a surface of the substrate and covering the active layer;
    an interlayer insulating layer disposed on a surface of the gate insulating layer, and a surface of the interlayer insulating layer provided with at least two first via-holes;
    a source/drain metal layer disposed on a surface of the interlayer insulating layer, the source/drain metal layer in communication with the active layer through one of the at least two first via-holes;
    a planarization layer disposed on a surface of the source/drain metal layer, a surface of the planarization layer provided with a second via-hole;
    a passivation layer disposed on a surface of the planarization layer, a surface of the passivation layer provided with a third via-hole;
    a pixel electrode layer disposed on a surface of the passivation layer, and the pixel electrode layer in communication with the source/drain metal layer through the second via-hole and the third via-hole;
    a gate signal wire disposed on the substrate;
    a source signal wire disposed on the substrate, and the source signal wire in communication with the active layer through another one of the at least two first via-holes;
    a light-shielding layer, the light-shielding layer being disposed along an arrangement direction of the gate signal wire, the light-shielding layer completely covers the gate signal wire, the source/drain metal layers and a portion of the pixel electrode layer; wherein the third via-hole is in communication with the second via-hole, the depth of the third via-hole being greater than the depth of the at least two first via-holes, the third via-hole partially overlaps or is side by side with one of the at least two first via-holes, or an interconnect formed by connecting both ends of the active layer is parallel to the gate signal wire.

2. The array panel of claim 1, wherein each of the at least two first via-holes, the second via-hole and the third via-hole has an inverted trapezoidal cross section.

3. The array panel of claim 1, wherein one of the at least two first via-holes extends through the interlayer insulating layer and the gate insulating layer and terminates in the active layer.

4. The array panel of claim 1, wherein the second via-hole extends through the planarization layer and terminates in the source/drain metal layer.

5. The array panel of claim 1, wherein the third via-hole extends through the passivation layer and terminates in the source/drain metal layer.

6. The array panel of claim 1, wherein when the third via-hole partially overlaps one of the at least two first via-holes, the source/drain metal layer has a first length, and when the third via-hole is side by side with one of the at least two first via-holes, the source/drain metal layer has a second length, and wherein the first length is less than the second length.

7. The array panel of claim 1, wherein when the interconnect formed by connecting both ends of the active layer is parallel to the gate signal wire, the source/drain metal layer is a rectangle having a long side parallel to the gate signal wire.

8. The array panel of claim 1, wherein the source/drain metal layer partially overlaps the gate signal wire.

9. The array panel of claim 8, wherein a portion of the third via-hole is disposed on an overlap region of the source/drain metal layer and the gate signal wire.

10. An array panel, comprising:
a substrate;
an active layer disposed on a surface of the substrate;
a gate insulating layer disposed on a surface of the substrate and covering the active layer;
an interlayer insulating layer disposed on a surface of the gate insulating layer, and a surface of the interlayer insulating layer provided with at least two first via-holes;
a source/drain metal layer disposed on a surface of the interlayer insulating layer, the source/drain metal layer in communication with the active layer through one of the at least two first via-holes;
a planarization layer disposed on a surface of the source/drain metal layer, a surface of the planarization layer provided with a second via-hole;
a passivation layer disposed on a surface of the planarization layer, a surface of the passivation layer provided with a third via-hole;
a pixel electrode layer disposed on a surface of the passivation layer, and the pixel electrode layer in communication with the source/drain metal layer through the second via-hole and the third via-hole;
a gate signal wire disposed on the substrate;
a source signal wire disposed on the substrate, and the source signal wire in communication with the active layer through another one of the at least two first via-holes;
a light-shielding layer, the light-shielding layer being disposed along an arrangement direction of the gate signal wire, the light-shielding layer completely covers the gate signal wire, the source/drain metal layer and a portion of the pixel electrode layer; wherein the third via-hole is in communication with the second via-hole, the third via-hole partially overlaps or is side by side with one of the at least two first via-holes, or an interconnect formed by connecting both ends of the active layer is parallel to the gate signal wire.

11. The array panel of claim 10, wherein each of the at least two first via-holes, the second via-hole and the third via-hole has an inverted trapezoidal cross section.

12. The array panel of claim 10, wherein one of the at least two first via-holes extends through the interlayer insulating layer and the gate insulating layer and terminates in the active layer.

13. The array panel of claim 10, wherein the second via-hole extends through the planarization layer and terminates in the source/drain metal layers.

14. The array panel of claim 10, wherein the third via-hole extends through the passivation layer and terminates in the source/drain metal layer.

15. The array panel of claim 10, wherein when the third via-hole partially overlaps one of the at least two first via-holes, the source/drain metal layer has a first length, and when the third via-hole not overlaps one of the at least two first via-holes, the source/drain metal layer has a second length, and wherein the first length is less than the second length.

16. The array panel of claim 10, wherein when the interconnect formed by connecting both ends of the active layer is parallel to the gate signal wire, the source/drain metal layer is a rectangle having a long side parallel to the gate signal wire.

17. The array panel of claim 10, wherein the source/drain metal layer partially overlaps the gate signal wire.

18. The array panel of claim 10, wherein a portion of the third via-hole is disposed on an overlap region of the source/drain metal layer and the gate signal wire.

* * * * *